United States Patent Office 3,158,294
Patented Nov. 24, 1964

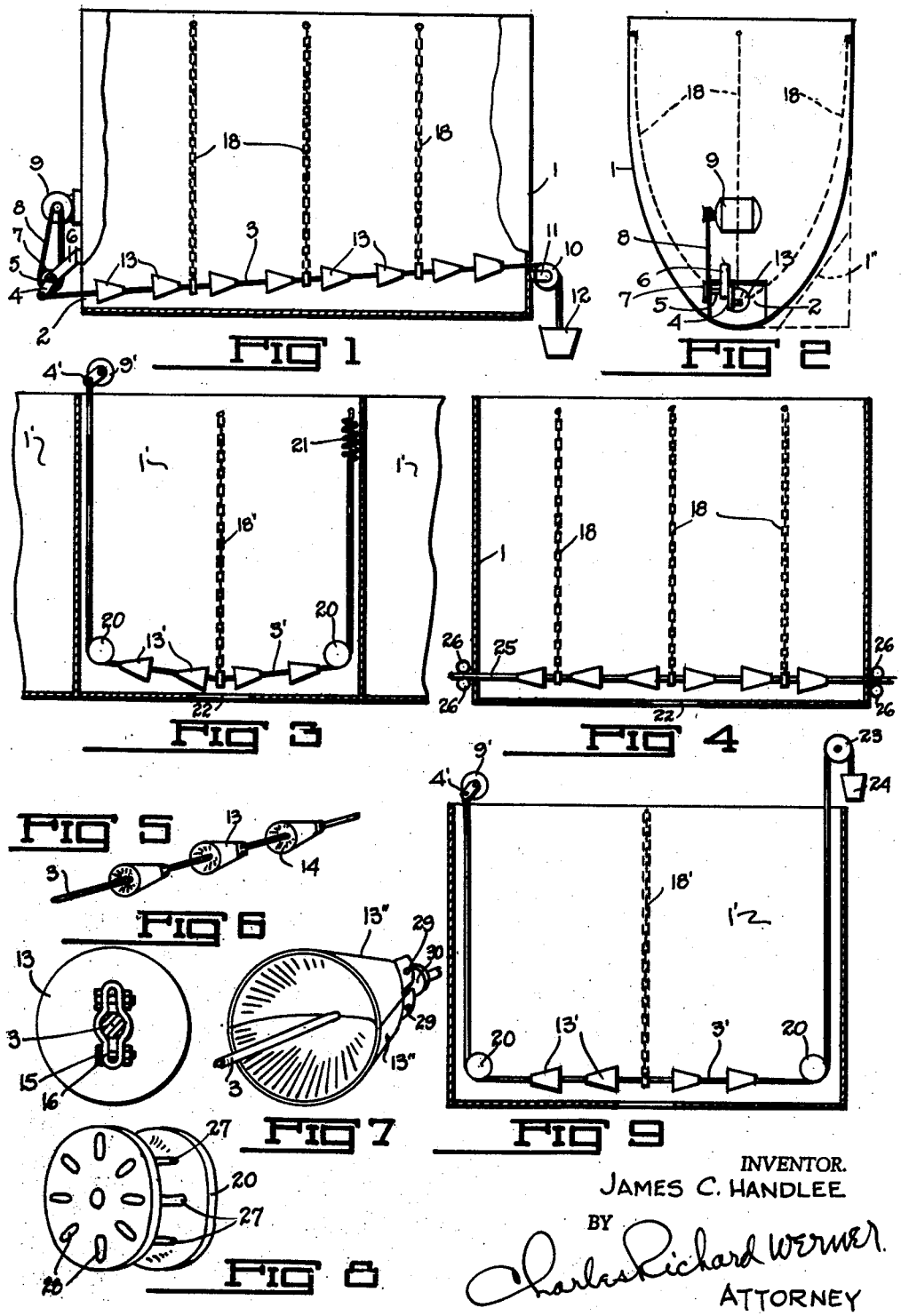

3,158,294
MATERIAL CONVEYING APPARATUS FOR BINS
James C. Handlee, Jacksonville, Fla.
(Box 158, Star Rte., Fort George, Fla.)
Filed Feb. 5, 1959, Ser. No. 791,501
16 Claims. (Cl. 222—227)

This invention relates in general to conveyors and in particular to a conveying system for removing sawdust, chips and waste from bins or hoppers in which such material is accumulated or stored in lumber or woodworking mills and in various other plants where such materials are used or collected as a result of particular processes.

Although there are various systems presently available to perform such a function, insofar as I am aware such systems are costly, require considerable maintenance, and do not completely operate in a satisfactory manner in that they often jam and do not entirely remove the waste material.

The very nature of some of the materials being discharged is such that it "mats up" and forms an arch over a discharge port or over the conveyor and requires manual rupture of the matted section before discharge can continue.

It is the primary object of my invention, therefore, to provide a waste removing conveyor which will continually agitate the waste as it is moved toward the discharge port.

It is another object of my invention to provide a waste removing conveyor in which waste is moved unilaterally toward an end discharge port with a weight or spring at the end of the conveyor opposite the discharge port for return of the conveyor at the end of each stroke.

One more object of my invention is to attach the upper end of each of a plurality of downwardly hanging chains to a waste bin having a flight conveyor positioned longitudinally at the bottom thereof, and securing the lower end of each downwardly hanging chain to the conveyor, whereby longitudinal movement of the conveyor will cause swinging movement of the hanging chains to serve as agitators to keep the waste from matting up.

Another object of the invention is to provide in a waste bin having a central discharge port, a conveyor with groups of oppositely disposed cone shaped flights or waste removal elements disposed on a rod or cable comprising a flight supporting means whereby reciprocating movement will continuously move the waste toward the centrally located discharge port.

And another object of my invention is to provide, in a waste bin, a conveyor arrangement on a cable passing around pulleys located at the bottom of the bin, said cable being directed upwardly with one end of the cable connected to a motivating mechanism and the other end of the cable secured to a spring or weight for return of the cable at the end of each stroke.

And still another object of my invention is to provide a conveyor arrangement for a waste bin in which a reciprocating rod comprises a supporting means and extends through the bin in substantially parallel arrangement and contiguous to the bottom thereof, with a plurality of cone shaped flights secured to the rod arranged to discharge the waste through a discharge outlet in the bin, and suitable means for reciprocating the rod.

And one more object of my invention is to provide a novel construction in the flight or waste moving element adapted for easy attachment to the rod or cable on which it is carried.

One more object of my invention is to provide an alternate form of substantially cone shaped flight in which the flight is segmented, the segments being hinged at their reduced ends whereby the segments will open upon discharge movement of said segment and will close on the reverse action.

One other object of my invention is to provide a new and novel construction in a pulley which will not clog with waste but will pass all waste through the pulley and laterally through apertures in the pulley ends permitting proper operation of the rod or cable on the pulley.

Other objects and advantages as well as the construction and manner of operation of my invention will be better understood by reference to the following description in connection with the accompanying drawing in which:

FIG. 1 is a vertical longitudinal sectional view through a bin with one form of my waste removing conveyor installed, an end discharge port or hatch being shown.

FIG. 2 is a vertical cross sectional view through the form of bin shown in FIG. 1.

FIG. 3 is a vertical sectional view through a series of adjoining bins with another form of the waste removal system being shown, a central discharge port or hatch being illustrated, and the flights secured to a reciprocating cable.

FIG. 4 is a vertical sectional view through a bin with a central discharge port, the flights being mounted on a reciprocating rigid rod carried by depending chains or the like.

FIG. 5 is a fragmentary isometric view of a number of flights mounted on a cable or rod.

FIG. 6 is an enlarged end view of one of the flights showing the manner of attachment to a rod or cable.

FIG. 7 is an isometric view of a modified form of segmental flight in which the segments of the flight are pivoted at their reduced ends.

FIG. 8 is an isometric view of one of the nonclog pulleys used with my waste conveyor system.

FIG. 9 is a vertical sectional view through another form of my device in which elevated actuating means and a weight for return movement of the waste conveyor are used.

Referring now to the drawing by numerals of reference, 1 designates a bin or container in which sawdust, woodchips, waste or other material is accumulated from lumber working, woodworking or other machinery, or in which material is stored prior to use.

In this particular form of bin, a discharge outlet or hatch 2 is located in one end and a supporting means including a cable or wire rope 3 extends through the opening or hatch and connects to a suitable arm 4 carried on shaft 5 pivoted in bracket 6, the shaft carrying pulley 7 being driven by chain 8 from a combination motor-speed reducer unit assembly 9.

The other end of the cable passes over pulley 10 carried by support 11 mounted to the bin, the depending end of the cable carrying a weight 12.

Spaced along the length of the supporting member or cable 3 internally of the bin are a plurality of waste actuators or flights 13, preferably cone shaped with the base 14 of the cone concave in shape as indicated in the isometric view of FIG. 5, and positioned toward the discharge opening. The reduced end of the cone is preferably flattened as shown in FIG. 6, with fastening members 15 passing through the flattened portions 16 to securely hold the flights on the cable 3.

A plurality of agitating members 18 formed of chains or cables or the like extend downwardly from the sides and top of the bin, those cables along the sides being preferably in a catenary curve as shown in FIG. 2 for agitating the waste as the chains are moved at each stroke the center agitating members hanging vertically and acting as additional supporting members for cable or wire rope 3.

It is to be noted in FIG. 2 that the bin is shown formed with sides having a substantially catenary curve, directing the waste toward the longitudinal central axis of the bin where the flights are located. However, bins may be rectangular with false bottoms 1″, achieving the same results.

In the form of my invention shown in FIG. 3, a plurality of adjoining bins 1′ are shown with the waste removal system shown in one of the bins although the same system can be repeated in any number of adjoining bins. In this particular form of waste removal system, a flight supporting means including the cable 3′ is connected at one end to arm 4′ driven by suitable motor and speed reducer 9′. The cable passes over pulleys 20 suitably carried by the bin, and terminates at the other end at spring 21 fastened in a suitable manner to the upper end of the bin. The flights 13′ are secured to the cable in oppositely disposed groups so that the concave sides of the flights direct the waste toward the central discharge opening 22. Suitable agitating members or chains 18′ attach to the cable which is spaced from the bottom of the bin, and serve to keep the waste constantly agitated as the chains are moved and also serve to support cable 3′.

In FIG. 9 the construction is similar to that shown in FIG. 3 and like numerals of reference have been used. The only difference is that one end of the cable passes over a pulley 23 and carries a weight 24 to keep the cable taut and to return it at each stroke.

In FIG. 4 the supporting means includes a rod 25 which extends through the bin 1 and may be carried on suitable rollers 26. Certain of the chain agitators 18 may aid in carrying the rod 25 and agitate the waste material in the bin. With the central discharge opening 22 the flights are arranged in oppositely disposed groups and direct the waste continually toward the central discharge opening while the chains keep the waste agitated and prevent the forming of arches. Suitable means, not shown, may be used to reciprocate the rod similar to that shown in FIG. 1.

In FIG. 8 I have illustrated one form of pulley 20 which can be used with my conveyer system, the pulleys having a hollow hub with a plurality of apertures 27 opening into the hub and a plurality of apertures 28 opening from the hollow hub, the sawdust, chips and other waste material passing into apertures 27 and out apertures 28 and never collecting or packing on the outer periphery of the hub to cause the cable or rod carried by the pulley to jump off.

It is found preferable, although not mandatory, that flights or cones be spaced about twice the effective length of the arm or crank 4.

In the alternate form of my flight or cone shown in FIG. 7 the cone is split into two segments 13″ hinged at 29 to a common carrier member 30 which in turn is suitably secured to the rod or cable 3. With this form of cone, the segments 13″ will open up and carry more waste before the flight than would the ordinary flight or cone member. Upon the return stroke the segments of the cone would close to present less resistance to the material being discharged.

The operation of any form of my device is quite simple. The to and fro movement of the flights or cones will cause the waste material to be moved toward the discharge opening. Arching or packing of the waste material will be prevented by the chains or agitators 18. Springs 21 or weights 24 will return the flights or cones to one extreme terminal or their movement, with a suitable motor and speed reducer moving the flights or cones to their other extreme position.

Where the discharge opening is centrally located, each movement of the flights will cause waste to discharge since the flights are oppositely disposed. My arrangement is particularly suited to bins which have sides which converge toward the bottom or have a catenary curve, since the contents of such bins will gravitate toward the longitudinal center line where the flights can effect discharge of the material collected there.

Obviously, various other arrangements and changes in form and proportions as well as details of construction may be resorted to without departing from the spirit of my invention and I reserve all rights to such changes as come within the scope of these specifications and the claims which follow.

What I claim as new and desire to secure by Letters Patent is:

1. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the bin preparatory to reverse discharge movement toward the discharge opening, the material removing flights comprising cone shaped elements mounted on the supporting means with the base of the cone directed substantially horizontally toward the discharge opening.

2. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the bin preparatory to reverse discharge movement toward the discharge opening, the material removing flights comprising cone shaped elements mounted on the supporting means with the base of the cone directed substantially horizontally toward the discharge opening, the base of the cones being concave.

3. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the bin preparatory to reverse discharge movement toward the discharge opening, the material removing flights each comprising a carrier member fixed to the supporting means, a plurality of elements forming a cone shaped flight when in non-discharging position, last-named elements being hinged to the carrier member and opening out of cone forming position when the flights are moved in a material discharging direction.

4. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the pin preparatory to reverse discharge movement toward the discharge opening, said bin having a pair of catenary formed sides directing material in said bin downwardly and inwardly toward the bottom and longitudinal center line of the bin, the discharge opening being located at the bottom of the bin between said catenary formed sides, the flight supporting means extending longitudinally between said sides and in alignment with the discharge opening.

5. The structure as specified in claim 4, and material agitating means having one end secured adjacent the top and sides of the bin, the other end of the material agitating means being secured to the supporting means, said material agitating means lying along a catenary in juxtaposition to the catenary formed sides of the bin.

6. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the bin preparatory to reverse discharge movement toward the discharge opening, and material agitating means between the flight supporting means and the bin, said material agitating means comprising a plurality of members supported at the top of the bin and secured to the flight supporting means.

7. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the bin preparatory to reverse discharge movement toward the discharge opening, and material agitating means between the flight supporting means and the bin, said material agitating means comprising a plurality of groups of members supported at the top of the bin and secured to the flight supporting means, each group of material agitating members having their upper ends spaced transversely of the bin and their lower ends terminating in a common juncture on the flight supporting means.

8. A material conveying apparatus including a bin having a pair of sides converging downwardly and an elongated substantially horizontal bottom, a discharge opening in one end of the bin, a supporting means extending along the bottom of the bin between the two converging sides and having one end extending from the discharge opening, a plurality of material removing flights carried by the supporting means, means adjacent the discharge opening for reciprocating the supporting means, a pulley secured externally of the bin, the other end of the supporting means extending through the end of the bin and passing over the pulley, and a weight secured to the supporting means to urge said supporting means and flights in one direction.

9. The structure as specified in claim 8, and material agitating means secured between the supporting means and the bin.

10. A material conveying apparatus including a bin having a pair of sides converging downwardly and an elongated substantially horizontal bottom, a discharge opening at the center in the bottom of the bin, a supporting means extending along the bottom of the bin, a plurality of material removing flights carried by the supporting means, the flights being oppositely disposed in groups on each side of the discharge opening, a material agitating means secured to the supporting means above the discharge opening and extending upwardly to the bin, a supporting means reciprocating means positioned on the bin, and means connecting said reciprocating means to the supporting means, a spring having one end secured to the bin, the other end of the spring being connected to the supporting means to urge said supporting means and flights in one direction, the reciprocating means urging the supporting means and flights in the opposite direction.

11. A material conveying apparatus including a bin having a pair of sides convering downwardly and an elongated substantially horizontal bottom, a discharge opening at the center in the bottom of the bin, a supporting means extending along the bottom of the bin, a plurality of material removing flights carried by the supporting means, the flights being oppositely disposed in groups on each side of the discharge opening, a material agitating means secured to the supporting means above the discharge opening and extending upwardly to the bin, a supporting means reciprocating means positioned on the bin, and means connecting said reciprocating means to the supporting means, a pulley carried by the bin, one end of the supporting means passing over the pulley, a weight secured to the end of the supporting means passing over the pulley to urge said supporting means and flights in one direction, the reciprocating means urging the supporting means and flights in the opposite direction.

12. A material conveying apparatus including a bin having a pair of sides converging downwardly and an elongated substantially horizontal bottom, a discharge opening at the center in the bottom of the bin, a rigid supporting means extending along the bottom of the bin and mounted for reciprocating movement, a plurality of material removing flights carried by the supporting means, the flights being oppositely disposed in groups on each side of the discharge opening, material agitating means secured to the supporting means and extending upwardly to the bin, reciprocating means driving the supporting means to move the flights to and fro in the bin.

13. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the bin preparatory to reverse discharge movement toward the discharge opening, and pulleys on which the flight supporting means are mounted, said pulleys having hollow hubs, apertures in the hubs for entrance thereto of material in the bin, and apertures in the sides of the pulleys for discharge of the material received through the first mentioned apertures.

14. A material conveying apparatus for use in a material receiving bin having an elongated substantially horizontal bottom and a discharge opening at the bottom of the bin, a plurality of substantially horizontally disposed material removing flights within the bin, means for supporting said flights in juxtaposition to the bottom of said bin, means for reciprocating the flights to carry material in the bin toward the discharge opening and to penetrate the material in the bin preparatory to reverse discharge movement toward the discharge opening, and material agitating means within the bin swingingly secured between the supporting means and the bin, said material agitating means being actuated by the flight reciprocating means.

15. The structure as specified in claim 14, said flight reciprocating means including a driving means at one end of the supporting means to swing the material agitating means and to move said supporting means horizontally in one direction, and means normally urging said supporting means, flights, and material agitating means in the opposite horizontal direction.

16. A material conveying apparatus for use in a material receiving bin having an elongated substantially horizontal bottom and a discharge opening in the bottom of the bin intermediate the ends of the bin, comprising a plurality of substantially horizontally disposed material removing flights within the bin, means for supporting said flights in juxtaposition to the bottom of said bin, means for reciprocating the flights whereby certain of the flights when moved in one direction are adapted to carry material in the bin toward the discharge opening while the remaining flights penetrate the material in the bin preparatory to the next reverse movement of the flights when the remaining flights move to carry material in the bin toward the discharge opening and certain of the flights first mentioned move to penetrate the material in the bin.

References Cited in the file of this patent

UNITED STATES PATENTS

| | | |
|---|---|---|
| 469,370 | Cutts | Feb. 23, 1892 |
| 734,631 | Stubbs | July 28, 1903 |
| 1,018,255 | Miller | Feb. 20, 1912 |
| 1,210,403 | Blake | Jan. 2, 1917 |
| 1,502,657 | Borcherdt | July 29, 1924 |
| 1,791,752 | Cross | Feb. 10, 1931 |
| 2,312,730 | Ring | Mar. 2, 1943 |
| 2,784,150 | Rose et al. | Mar. 5, 1957 |
| 2,801,773 | Vitkin | Aug. 6, 1957 |

FOREIGN PATENTS

| | | |
|---|---|---|
| 47,857 | Germany | July 24, 1889 |
| 161,259 | Germany | June 16, 1905 |
| 212,641 | Great Britain | Mar. 14, 1924 |
| 686,832 | Germany | Jan. 17, 1940 |
| 838,425 | Germany | May 8, 1952 |